US012360486B2

(12) United States Patent
Yasaki

(10) Patent No.: US 12,360,486 B2
(45) **Date of Patent: *Jul. 15, 2025**

(54) IMAGE FORMING APPARATUS

(71) Applicant: CANON KABUSHIKI KAISHA, Tokyo (JP)

(72) Inventor: Kosuke Yasaki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,562

(22) Filed: Jun. 10, 2024

(65) Prior Publication Data

US 2024/0329587 A1 Oct. 3, 2024

Related U.S. Application Data

(63) Continuation of application No. 18/189,957, filed on Mar. 24, 2023, now Pat. No. 12,025,940.

(30) Foreign Application Priority Data

Mar. 28, 2022 (JP) ................................ 2022-051010

(51) Int. Cl.
*G03G 15/00* (2006.01)
*G03G 21/16* (2006.01)

(52) U.S. Cl.
CPC ......... *G03G 15/70* (2013.01); *G03G 15/5016* (2013.01); *G03G 21/1633* (2013.01)

(58) Field of Classification Search
CPC ............... G03G 15/70; G03G 15/5016; G03G 21/1633
See application file for complete search history.

(56) References Cited

U.S. PATENT DOCUMENTS

| | | | | | |
|---|---|---|---|---|---|
| 5,132,786 | A * | 7/1992 | Ishiwata | H04N 1/62 358/500 |
| 7,394,839 | B2 * | 7/2008 | Han | H04N 1/40037 372/24 |
| 2010/0247133 | A1 * | 9/2010 | Sugahara | G03G 15/5004 399/81 |
| 2012/0013650 | A1 * | 1/2012 | Mizubuchi | G09G 3/3648 345/690 |
| 2013/0287434 | A1 * | 10/2013 | Hisano | G03G 21/1619 399/110 |
| 2017/0205761 | A1 * | 7/2017 | Mitsui | G03G 21/1633 |
| 2019/0369549 | A1 * | 12/2019 | Kojima | G03G 15/5004 |
| 2023/0244164 | A1 * | 8/2023 | Kidoura | G03G 15/70 399/69 |

* cited by examiner

*Primary Examiner* — David H Banh
(74) *Attorney, Agent, or Firm* — Canon U.S.A., Inc. IP Division

(57) ABSTRACT

An image forming apparatus includes a plurality of light emitting portions configured to expose to light a photosensitive drum, a detection unit configured to detect an opening of a maintenance door, a output unit configured to output image data for controlling turning on and off of the plurality of light emitting portions, a drive unit configured to drive the plurality of the light emitting portions based on the image data, wherein the photosensitive drum stops rotating when the detection unit detects that the maintenance door is open, wherein the output unit output the image data indicating turning off of the plurality of light emitting portions when the detection unit detects that the maintenance door is open, and a power supplied to the drive unit is maintained in a case where the maintenance door is opened.

13 Claims, 11 Drawing Sheets

IMAGE FORMING APPARATUS

CROSS-REFERENCE TO RELATED APPLICATIONS

This application is a continuation of U.S. application Ser. No. 18/189,957, filed Mar. 24, 2023, which claims the benefit of priority from Japanese Patent Application No. 2022-051010, filed Mar. 28, 2022, all of which are hereby incorporated by reference herein in their entirety.

BACKGROUND

Field of the Disclosure

The present disclosure relates to an image forming apparatus configured to form a latent image on a surface of a photosensitive drum by exposing the photosensitive drum to light.

Description of the Related Art

Conventionally, there is known an image forming apparatus configured to form a latent image on a surface of a photosensitive drum, by exposing a photosensitive layer provided on the surface of a rotatable photosensitive drum to light emitted from an exposure head including an organic light emitting diode (OLED) as a light source (see Japanese Patent Application Laid-open No. 2017-87687). The latent image is formed on the surface of the photosensitive drum due to potential change on the surface of the photosensitive drum, caused by charges on the surface of the photosensitive drum charged to be a predetermined potential and charges generated in an internal portion of the photosensitive layer by the exposure being neutralized. The image forming apparatus develops the latent image formed on the surface of the photosensitive drum by applying toner thereto, and forms an image on a recording medium by transferring the developed toner image.

In the image forming apparatus, a rotation of the photosensitive drum is stopped when a maintenance door is opened to expose an internal portion of the image forming apparatus during an image formation job for forming an image on a recording medium. For example, if an exposure operation by the exposure head continues after the rotation of the photosensitive drum is stopped due to the opening of the maintenance door, a same position on the surface of the stopped photosensitive drum is continuously irradiated with the light from the exposure head. As a result, charges generated in the photosensitive layer by the exposure are accumulated in the internal portion of the photosensitive layer. As a result, when the image formation job is started again and charging is performed on the surface of the photosensitive drum by the closing of the maintenance door, the charges on the surface of the photosensitive drum is neutralized with the charges accumulated in the internal portion of the photosensitive layer. As a result, there is a possibility that a latent image is formed at a position where no exposure operation is performed by the exposure head, and an image not intended by a user is formed on the recording medium.

SUMMARY

The present disclosure generally provides an image forming apparatus for forming an image on a recording medium capable of suppressing an unintended formation of a latent image on a surface of a photosensitive drum.

An image forming apparatus for forming an image on a recording medium includes a photosensitive drum configured to rotate about a rotation shaft, a charging unit configured to charge a surface of the photosensitive drum to be a predetermined potential, a plurality of light emitting portions arranged along the rotation shaft of the photosensitive drum and configured to expose to light the surface of the photosensitive drum charged by the charging unit to form a latent image on the surface of the photosensitive drum, a maintenance door configured to expose an internal portion of the image forming apparatus in a case where opened, a detection unit configured to detect an opening of the maintenance door, a output unit configured to output image data for controlling turning on and off of the plurality of light emitting portions, a drive unit configured to drive the plurality of light emitting portions based on the image data output by the output unit, and a power source configured to supply power to the drive unit, wherein the photosensitive drum stops rotating in a case where the detection unit detects that the maintenance door is open while an image formation job is performed, wherein the output unit outputs the image data indicating turning off of the plurality of light emitting portions in a case where the detection unit detects that the maintenance door is open, and wherein the power supplied by the power source to the drive unit is maintained in a case where the maintenance door is opened.

Further features of the present disclosure will become apparent from the following description of embodiments with reference to the attached drawings.

DESCRIPTION OF THE EMBODIMENTS

<Overall Configuration of Image Forming Apparatus>

Hereinbelow, an overall configuration of an image forming apparatus 10 according to a first embodiment will be described with reference to the attached drawings. Note that dimensions, materials, shapes, and the relative layout of components described below are not intended to limit the scope of the present disclosure thereto unless otherwise specifically described.

Figure 1:
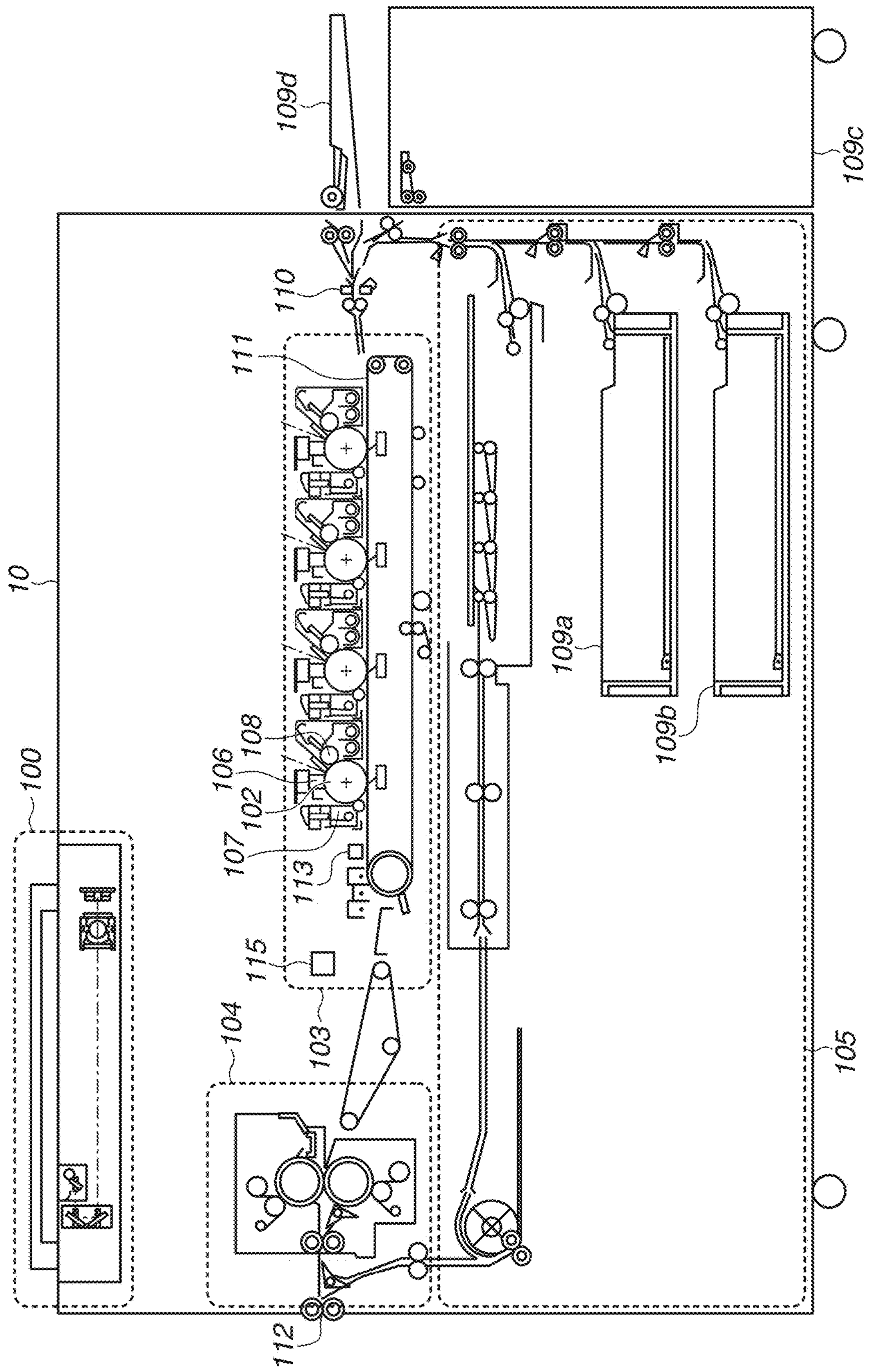
FIG. 1 is a cross-section diagram illustrating an image forming apparatus.

FIG. 1 is a cross-section diagram illustrating the image forming apparatus 10 according to the first embodiment. The image forming apparatus 10 includes a scanner unit 100, an image forming device 103, a fixing unit 104, a sheet feed/conveyance unit 105, and a printer control unit 708 (see FIG. 5) for controlling these units.

The scanner unit 100 reads a document image of a document placed on a platen glass by irradiating the document with light, and generates image data by converting the read document image into an electrical signal.

In the image forming device 103, a photosensitive drum 102 rotates about a rotation shaft and is charged by a charging device 107 (charging unit).

The surface of the photosensitive drum 102 is charged to be a predetermined potential by the discharge to the surface of the photosensitive drum 102 performed by the charging device 107 with a predetermined voltage applied thereto.

The charging device 107 with the predetermined voltage applied thereto may contact the surface of the photosensitive drum 102 to charge the surface of the photosensitive drum 102 to be the predetermined potential.

An exposure head 106 emits light based on the image data generated by the scanner unit 100 and condenses the light emitted from an arranged light emission element group 201 (see FIG. 3B) on the photosensitive drum 102 to expose the surface of the photosensitive drum 102 to the condensed light.

The surface of the photosensitive drum 102 is provided with a photosensitive member including a photosensitive layer therein, and generates electric charges when the photosensitive layer is irradiated with the light. The potential of the surface of the photosensitive drum 102 changes to form a latent image, by the charges generated in the photosensitive layer in the internal portion of the photosensitive member and the charges on the surface of the photosensitive drum 102 being neutralized by the exposure. In this way, a latent image is formed on the surface of the photosensitive drum 102 by the light emitted from the light emission element group 201 including a plurality of light emission elements 602 (see FIG. 4B).

A development unit 108 forms a toner image by applying toner to the latent image formed on the photosensitive drum 102. The formed toner image is transferred onto a sheet conveyed on a transfer belt 111. Thus, the sheet is equivalent to a recording medium.

The image forming device 103 includes four image forming units (stations) for performing a series of electrophotographic processes (charge, exposure, development, and transfer) to form a full color image by arranging the four image forming units in the order of cyan (C), magenta (M), yellow (Y), and black (K). The four image forming units sequentially perform the image forming operations of magenta, yellow, and black after a predetermined time has elapsed since the start of the image formation by the cyan image station.

In the sheet feed/conveyance unit 105, from among built-in sheet feed units 109*a* and 109*b*, an external sheet feed unit 109*c*, and a manual sheet feed unit 109*d*, the manual sheet feed unit 109*d* designated in advance feeds a sheet, and the fed sheet is conveyed to a registration roller 110.

The registration roller 110 conveys the sheet onto the transfer belt 111 at a timing when the toner image formed by the image forming device 103 described above is transferred onto the sheet. An optical sensor 113 is arranged at a position opposing the transfer belt 111. The optical sensor 113 detects a position of a test chart printed on the transfer belt 111 to derive a shift amount of a position at which toner image is transferred by each station. A notification of the shift amount of the position at which each station transfers the toner image derived at this time is sent to an image controller unit 700 (see FIG. 5), and the image position of each color is corrected. With this control, a full color toner image with no position shifts between colors is transferred on the sheet.

The fixing unit 104 is configured of a combination of rollers and includes a heat source such as a halogen heater therein. The fixing unit 104 fuses and fixes, with heat and pressure, the toner on the sheet onto which the toner image is transferred from the transfer belt 111, and a sheet discharge roller 112 discharges the sheet to the outside of the image forming apparatus 10.

The series of operations performed in the image forming apparatus 10, from the reading of the image by the scanner unit 100 to the discharging of the recording medium with the image formed thereon to the outside of the image forming apparatus 10, are referred to as an image formation job.

Figure 2:
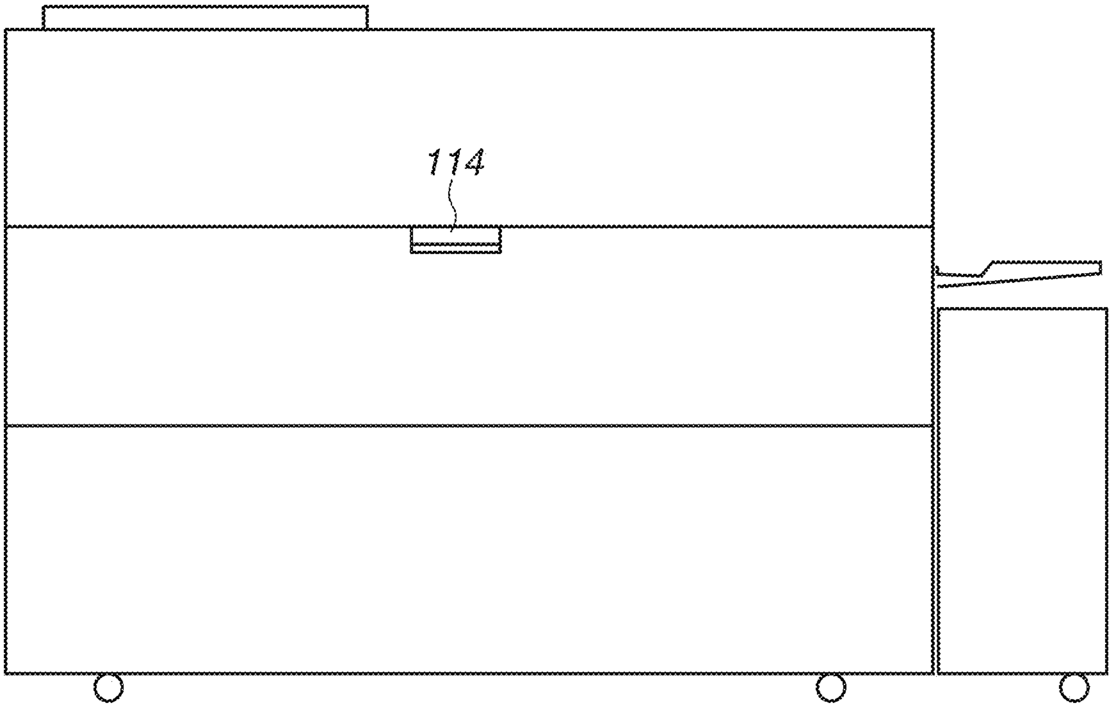
FIG. 2 is a diagram illustrating an external appearance of the image forming apparatus.

FIG. 2 is a diagram illustrating an external appearance of the image forming apparatus 10 according to the present embodiment.

The printer control unit 708 outputs, when a detection unit described below detects an opening of a maintenance door 114 during the image formation job, an emergency stop signal 704 to emergently stop the image forming device 103, the fixing unit 104, and the sheet feed/conveyance unit 105. The emergency stop protects the members in the internal portion of the image forming apparatus 10 and secures the safety of users. Further, in the case where the opening of the maintenance door 114 is detected and the image forming device 103 is stopped during the image formation job, the rotation of the photosensitive drum 102 is stopped.

When the maintenance door 114 is opened, the internal portion of the image forming apparatus 10 is exposed. The internal portion of the image forming apparatus 10 exposed by the opening of the maintenance door 114 includes, for example, the image forming device 103, the fixing unit 104, and the sheet feed/conveyance unit 105. When the maintenance door 114 is opened, a sensor 115 detects the opening of the maintenance door 114 and transmits the opening of the maintenance door 114 detected by the sensor 115 to the printer control unit 708. Thus, the sensor 115 is equivalent to the detection unit.

Further, examples of abnormal conditions that may occur during the exposure operation for the photosensitive drum 102 include a paper jam of a sheet in a sheet conveyance path. A registration sensor arranged at the registration roller 110 in the sheet conveyance path measures a time at which a leading edge of the sheet passes through the registration roller 110 and a time at which a trailing edge of the sheet passes through the registration roller 110. The time period required between when the leading edge of the sheet passes through the registration roller 110 and when the trailing edge of the sheet passes through the registration roller 110 is compared with a predetermined threshold value. In a case where the time period required for passing through the registration roller 110 is longer than the predetermined threshold value, the occurrence of the paper jam is detected, and the occurrence of the detected paper jam is output to the printer control unit 708.

The detection of the paper jam may be performed at the image forming device 103, the fixing unit 104, or the sheet feed/conveyance unit 105, not limited to the registration roller 110, as long as the paper jam is detected in the recording medium conveyance path.

<Configuration of Exposure Head>

The exposure head 106 for performing the exposure of the photosensitive drum 102 will be described.

Figure 3A:
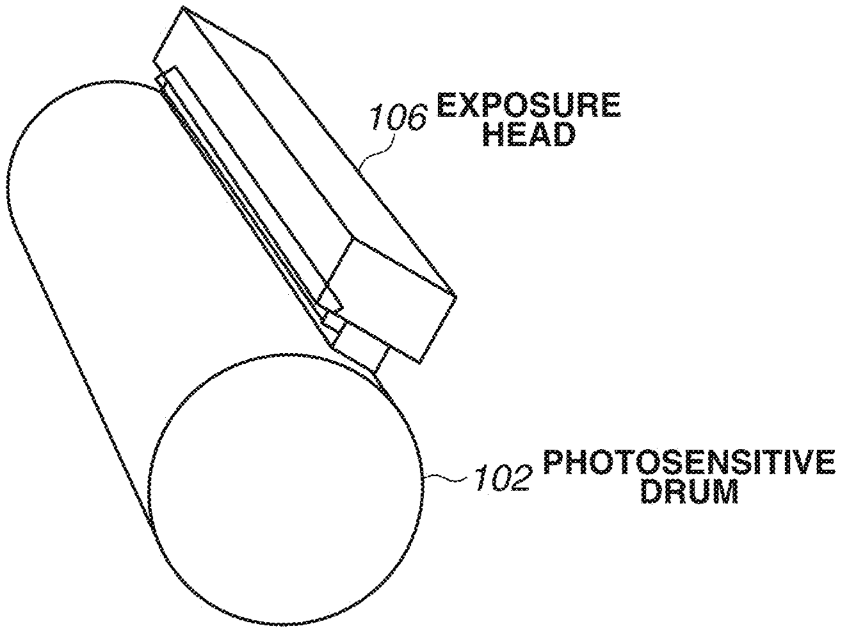
FIGS. 3A and 3B are diagrams illustrating a layout relationship between a photosensitive drum and an exposure head.
Figure 3B:
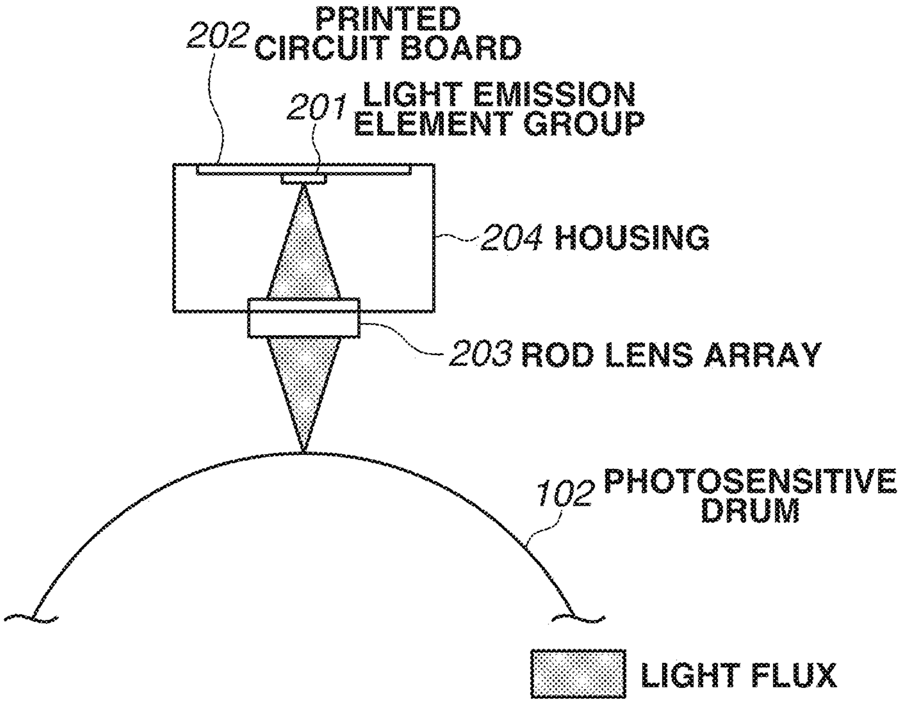

FIGS. 3A and 3B respectively illustrate a state of an arrangement of the exposure head 106 with respect to the photosensitive drum 102, and a state where the light output from the light emission element group 201 is condensed on the photosensitive drum 102 by a rod lens array 203. The exposure head 106 and the photosensitive drum 102 are attached to the image forming apparatus 10 each using a fastening member (not illustrated).

The exposure head 106 includes the light emission element group 201, a printed circuit board 202 with the light emission element group 201 mounted thereon, the rod lens array 203, and a housing 204 to which the rod lens array 203 and the printed circuit board 202 are attached. The exposure head 106 is fixed in such a manner that the light emitted from the light emission element group 201 is focused on the photosensitive drum 102 via the rod lens array 203.

<Configuration of Printed Circuit Board>

Figure 4A:
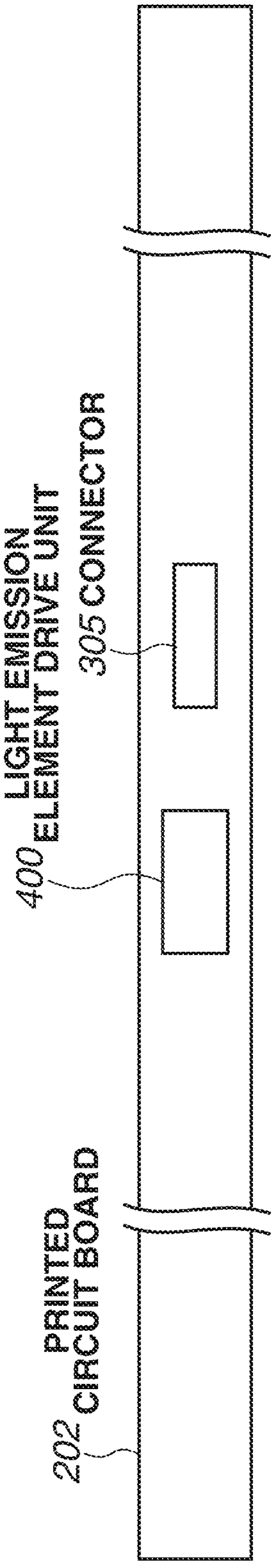
FIGS. 4A and 4B are diagrams illustrating a configuration of a printed circuit board.
Figure 4B:
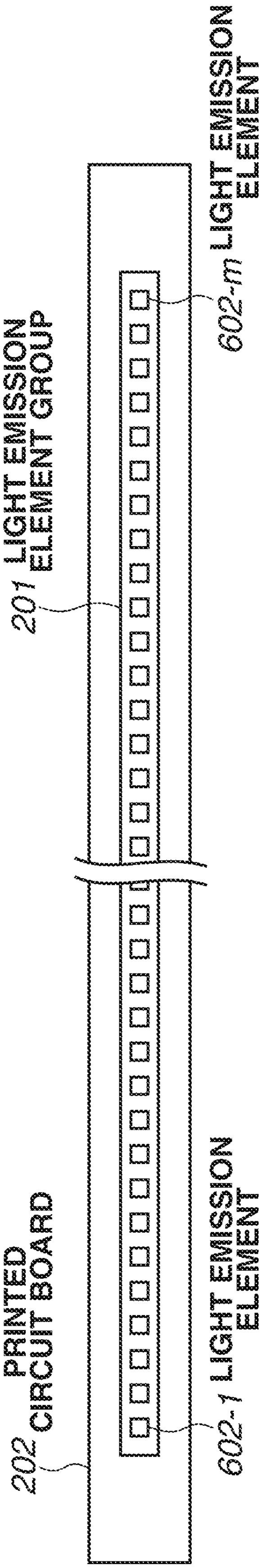

FIGS. 4A and 4B are diagrams illustrating a configuration of the printed circuit board 202.

FIG. 4A illustrates a surface (hereinbelow, referred to as a light emission element unmounted surface) opposite to a surface on which the light emission element group 201 is mounted, and FIG. 4B illustrates the surface on which the light emission element group 201 is mounted (hereinbelow, referred to as a light emission element mounted surface).

The light emission element group 201 is configured of a plurality of arrayed light emission elements 602 (602-1 to 602-*m*). The light emission elements 602 are arranged on the light emission element mounted surface of the printed circuit board 202 in a lengthwise direction, with a predetermined resolution pitch.

The lengthwise direction on the light emission element mounted surface of the printed circuit board 202 is a direction along the axis direction of the photosensitive drum 102, and each of the light emission elements 602, which are light emitting units, is arranged along the lengthwise direction of the photosensitive drum 102. Thus, the light emission elements 602 are equivalent to the light emitting units.

In the present embodiment, the light emission elements 602 serving as the light emitting units are formed on a light emission substrate, which is a silicon substrate. On the light emission substrate, a plurality of lower electrodes is formed, and on the plurality of lower electrodes, a light emission layer is provided. On the light emission layer, an upper electrode, which is a common electrode for the plurality of lower electrodes, is provided. When a predetermined voltage is applied between the lower electrodes and the upper electrode, current flows from the lower electrodes to the upper electrode, and the light emission layer emits light.

An organic electroluminescence (EL) film can be used for the light emission layer. An inorganic EL film can also be used for the light emission layer. The upper electrode is formed of a transparent electrode made of, for example, indium tin oxide, to allow the emission wavelength of the light emission layer to transmit. In the present embodiment, the entire area of the upper electrode allows the light with the emission wavelength of the light emission layer to transmit therethrough, but the entire area of the upper electrode does not necessarily need to allow the light with the emission wavelength to transmit therethrough. More specifically, only the area irradiated with the light emitted from each of the light emission elements 602 needs to allow the light with the emission wavelength to transmit therethrough.

In the present embodiment, the light emission elements 602 are arranged on the light emission element mounted surface of the printed circuit board 202 in the lengthwise direction thereof, with a 1200 dots per inch (dpi) resolution pitch (21.16 μm) with respect to each neighboring light emission element 602.

Further, in the light emission element group 201, n=14, 173 light emission elements 602 are arranged, and accordingly, it is possible to form an image with an image width of about 300 mm in the lengthwise direction of the photosensitive drum 102.

Further, the distance between the light emission elements 602 and the number of the light emission elements 602 are merely an example in the present embodiment, and are not limited to the resolution pitch and the number of the light emission elements 602 described above.

On the light emission element unmounted surface, a connector 305 is arranged to connect a light emission element drive unit 400 with a power source 300 (see FIG. 5) and control signals for controlling the light emission element drive unit 400 from the image controller unit 700. Examples of the control signals input to the light emission element drive unit 400 via the connector 305 include a clock signal 705 (see FIG. 5), a synchronization signal 706 (see FIG. 5), and a data signal 707 (see FIG. 5). The power source 300 connected with the connector 305 supplies power used by the light emission element drive unit 400 to drive the light emission element group 201, to the light emission element drive unit 400.

Figure 5:
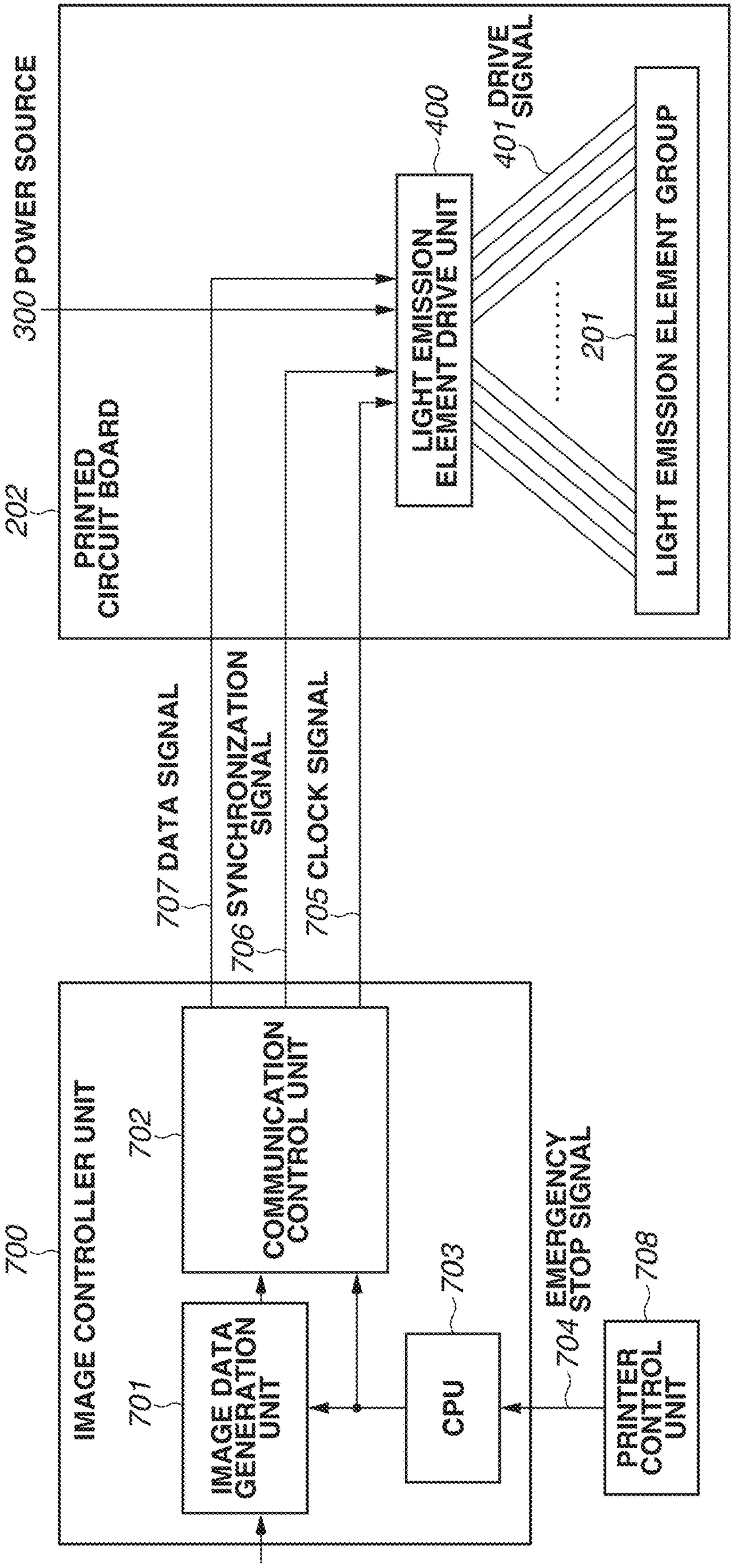
FIG. 5 is a block diagram illustrating an image controller unit and the printed circuit board.

FIG. 5 is a block diagram illustrating configurations of the image controller unit 700 and the printed circuit board 202.

In the present embodiment, to simplify descriptions, processing for one color will be described, but the same processing is performed in a parallel manner at a time on the four colors of cyan (C), magenta (M), yellow (Y), and black (K).

The image controller unit 700 outputs signals to the printed circuit board 202 to control the light emission element drive unit 400, following an instruction from the printer control unit 708. This signals include the clock signal 705, the synchronization signal 706 indicating a communication data start timing, and the data signal 707 described below in detail.

The data signal 707 includes at least one of the image data for controlling turning on and off of the light emission elements 602 and data to be written in a register of the light emission element drive unit 400.

The clock signal 705, the synchronization signal 706, and the data signal 707 are output to the light emission element drive unit 400 via the connector 305.

The image controller unit 700 includes an image data generation unit 701, a communication control unit 702, a central processing unit (CPU) 703, and performs processing on the image data and the print timing.

The image data generation unit 701 performs dithering processing with a resolution instructed by the CPU 703 on the image data received from the scanner unit 100 or the outside of the image forming apparatus 10, to generate image data for a print output. In the present embodiment, to match the pitch of the light emission elements 602, the dithering processing is performed with a resolution of 1,200 dpi in the lengthwise direction (main scanning direction), and a resolution of 1,200 dpi in the sub scanning direction, of the light emission element mounted surface of the printed circuit board 202. Further, the image data expresses on/off of each of the light emission elements 602 in binary, and on/off of each of the light emission elements 602 is controlled based on the image data.

The image data generation unit 701 outputs the image data to the communication control unit 702 after the dithering processing is performed on the image data.

The synchronization signal 706 is a line synchronization signal output in synchronization with the clock signal 705.

The synchronization signal 706 is generated by setting, as one period, a period in which the surface of the photosensitive drum 102 moves by a distance corresponding to a pixel size of 1200 dpi (about 21.16 μm) in the rotation direction of the photosensitive drum 102 with respect to the rotation speed of the photosensitive drum 102 determined in advance.

The communication control unit 702 outputs the image data generated by the image data generation unit 701 to the light emission element drive unit 400 in synchronization with the synchronization signal 706.

Further, in a case where the communication control unit 702 is requested by the CPU 703 to output a register setting value to the light emission element drive unit 400, the register setting value is output to the light emission element drive unit 400 in synchronization with the synchronization signal 706.

The image controller unit 700 includes the image data generation unit 701 and the communication control unit 702, and the communication control unit 702 outputs the image data generated by the image data generation unit 701, in synchronization with the synchronization signal 706, which is a predetermined period signal. Thus, the image controller unit 700 is equivalent to a generation unit.

Upon receiving the emergency stop signal 704 from the printer control unit 708, the CPU 703 controls the image data generation unit 701 to generate and output white image data indicating turning off of the light emission elements 602 to turn off the light emission element group 201. Details thereof will be described below.

By turning off the light emission element group 201 at a time of the emergency stop, the CPU 703 prevents a same point on the stopped photosensitive drum 102 from being irradiated with the light emitted from the light emission element group 201.

Figure 6:
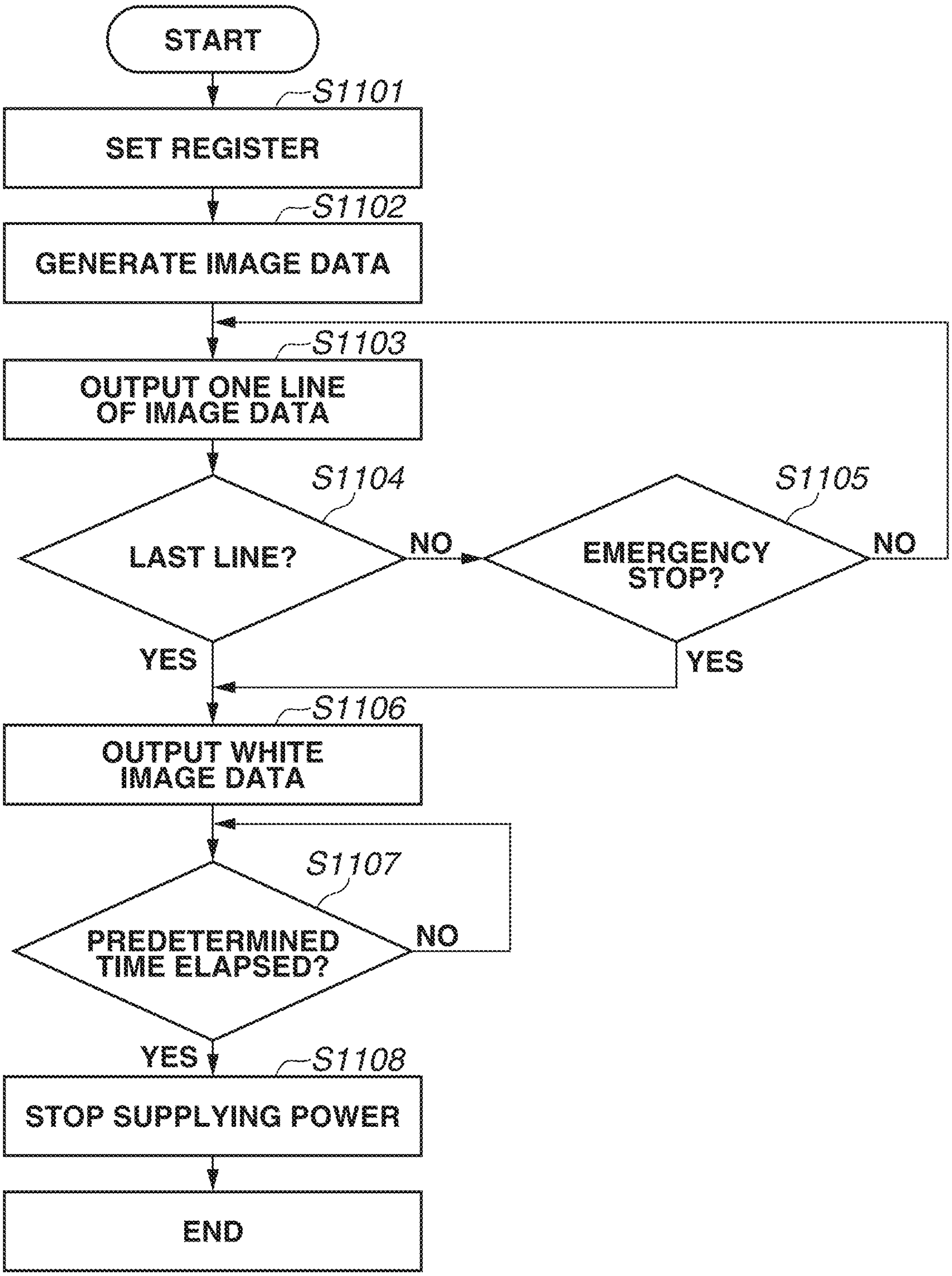
FIG. 6 is a flowchart illustrating emergency stop processing.
Figure 7:
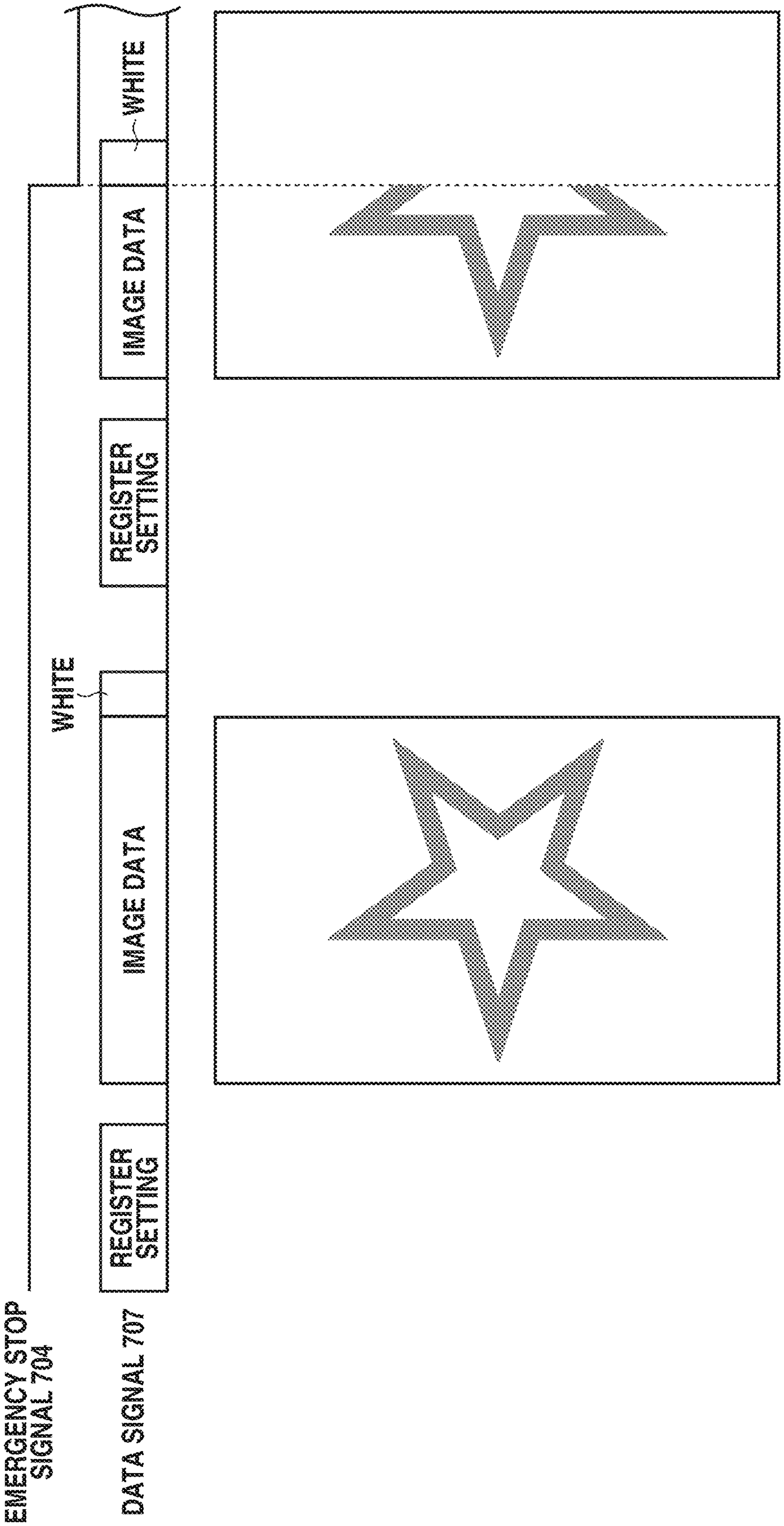
FIG. 7 is a schematic diagram illustrating a light-emission turning off operation during an image formation.

The series of control operations by the CPU 703 will be described with reference to a flowchart in FIG. 6 and a diagram in FIG. 7. The processing in the flowchart of FIG. 6 is executed by the CPU 703.

In step S1101, the CPU 703 performs a register setting operation when a print operation is started in response to an instruction from the printer control unit 708. Setting information of the drive current for driving the light emission elements 602 is changed by the operation of outputting the register setting value to the light emission element drive unit 400 from the communication control unit 702 following the instruction from the CPU 703.

Next, in step S1102, the CPU 703 instructs the image data generation unit 701 to generate image data. With this operation, image data with a resolution of 1200 dpi both in the main scanning direction and the sub scanning direction is generated.

Then, in step S1103, the CPU 703 starts image formation by controlling the image data generated by the image data generation unit 701 to be output from the communication control unit 702, based on a predetermined period. The predetermined period corresponds to, for example, the period of the synchronization signal 706.

The CPU 703 performs this operation in the main scanning direction one-line by one-line up to the last line, to form the image for one page. In step S1104, the CPU 703 determines whether the last line of the image data is output. In step S1104, in a case where the CPU 703 determines that the image of the last line is output (YES in step S1104), the processing proceeds to step S1106.

In step S1104, in a case where the CPU 703 determines that the image of the last line is not output yet (NO in step S1104), the processing proceeds to step S1105. In step S1105, the CPU 703 determines whether the emergency stop signal 704 is received. In step S1105, in a case where the CPU 703 receives the emergency stop signal 704 during the exposure operation (YES in step S1105), the CPU 703 stops outputting the image data generated in step S1102 by the image data generation unit 701, and the processing proceeds to step S1106. Then, in step S1106, the communication control unit 702 outputs white image data indicating turning off of the light emission elements 602 generated by the image data generation unit 701 to the light emission element drive unit 400.

The communication control unit 702 turns off the light emission element group 201 by transmitting the white image data to the light emission element drive unit 400. As a result, it is possible to prevent a same point on the photosensitive drum 102 from being continuously irradiated with the light emitted from the light emission element group 201. FIG. 7 is a diagram illustrating processing performed in step S1106.

In a case where the CPU 703 does not receive the emergency stop signal 704 while the image data is being output, after the image data of the last line is output, in step S1106, the CPU 703 stops the emission of light from the light emission element group 201 by additionally outputting the white image data.

In step S1106, light emission control units 805 (see FIG. 9) latch the white image data for one line using a latch function described below, to keep the light turned off state of the light emission elements 602. In addition, while the photosensitive drum 102 is stopped, the light turned off state of the light emission elements 602 may be kept by the communication control unit 702 continuously transmitting the white image data to the light emission element drive unit 400.

In step S1107, the CPU 703 determines whether a predetermined time has elapsed since the communication control unit 702 transmitted the white image data. In step S1107, in a case where the predetermined time has elapsed since the communication control unit 702 transmitted the white image data (YES in step S1107), the processing proceeds to step S1108. In step S1108, the CPU 703 stops supplying power to the light emission element drive unit 400, and then the processing ends. By stopping supplying power to the light emission element drive unit 400 after the elapse of the predetermined time, it is possible to reduce the power consumption when the light emission elements 602 are in a light turned off state. In the present embodiment, the predetermined time is set to 5 minutes to 10 minutes as an example of the predetermined time, but the predetermined time is not limited thereto, and a different time may be set.

In addition, in steps S1107 and S1108, the power supply to the light emission element drive unit 400 may be kept, without stopping supplying power to the light emission element drive unit 400 when the predetermined time has elapsed.

The image data generated by the series of controls is output from the communication control unit 702 to the light emission element drive unit 400. The light emission element drive unit 400 operates based on the clock signal 705, the synchronization signal 706, and the data signal 707, output from the communication control unit 702.

A signal line is connected from the light emission element drive unit 400 to each of the light emission elements 602 in the light emission element group 201, and the light emission control is performed using the line.

Figure 8:
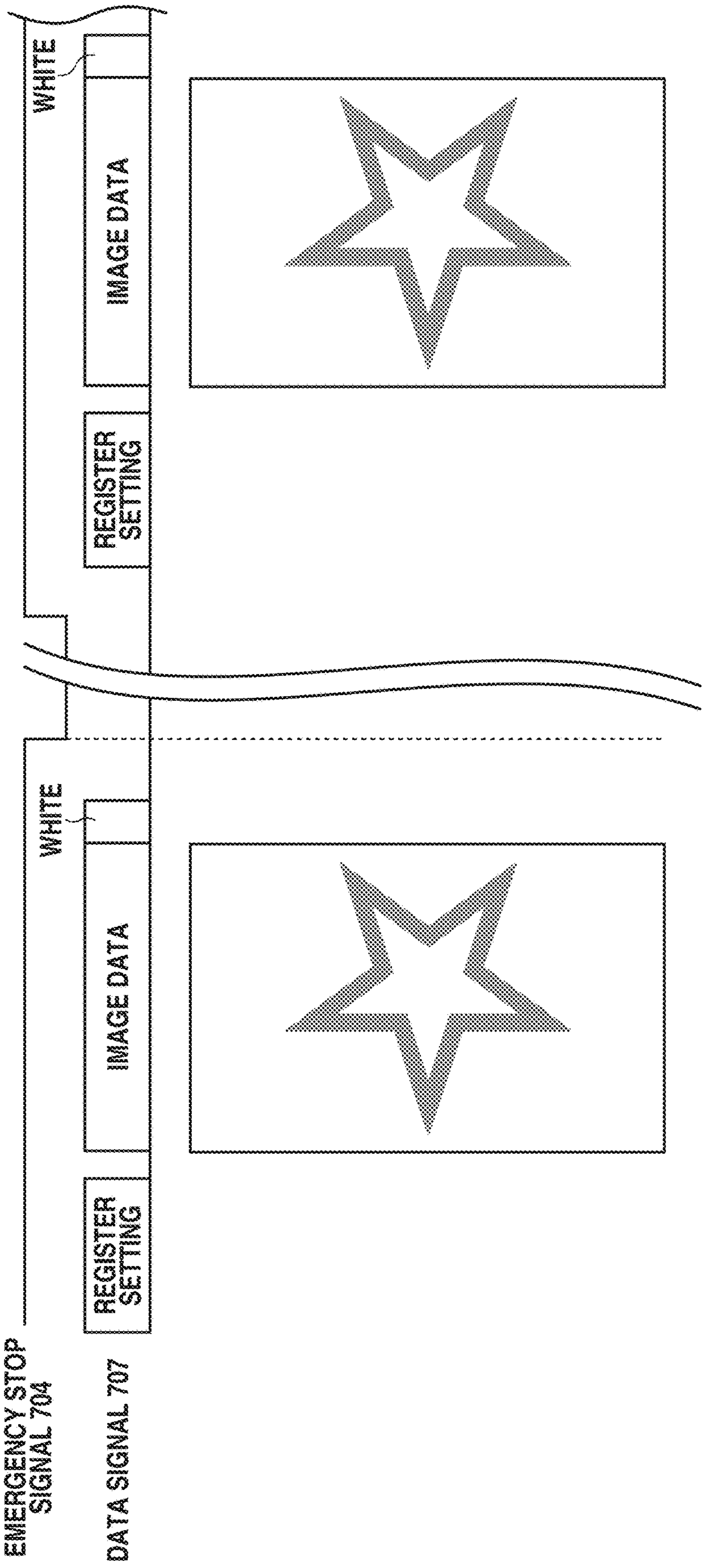
FIG. 8 is a schematic diagram illustrating a light-emission turning off operation after the image formation.

In addition, as illustrated in FIG. 8, in a case where the emergency stop signal 704 is input at a timing other than the timing at which the image data is being output, since the light emission of the light emission element group 201 is stopped, the operation of outputting the white image data again may be canceled.

<Circuit Blocks of Light Emission Element Drive Unit>

Figure 9:
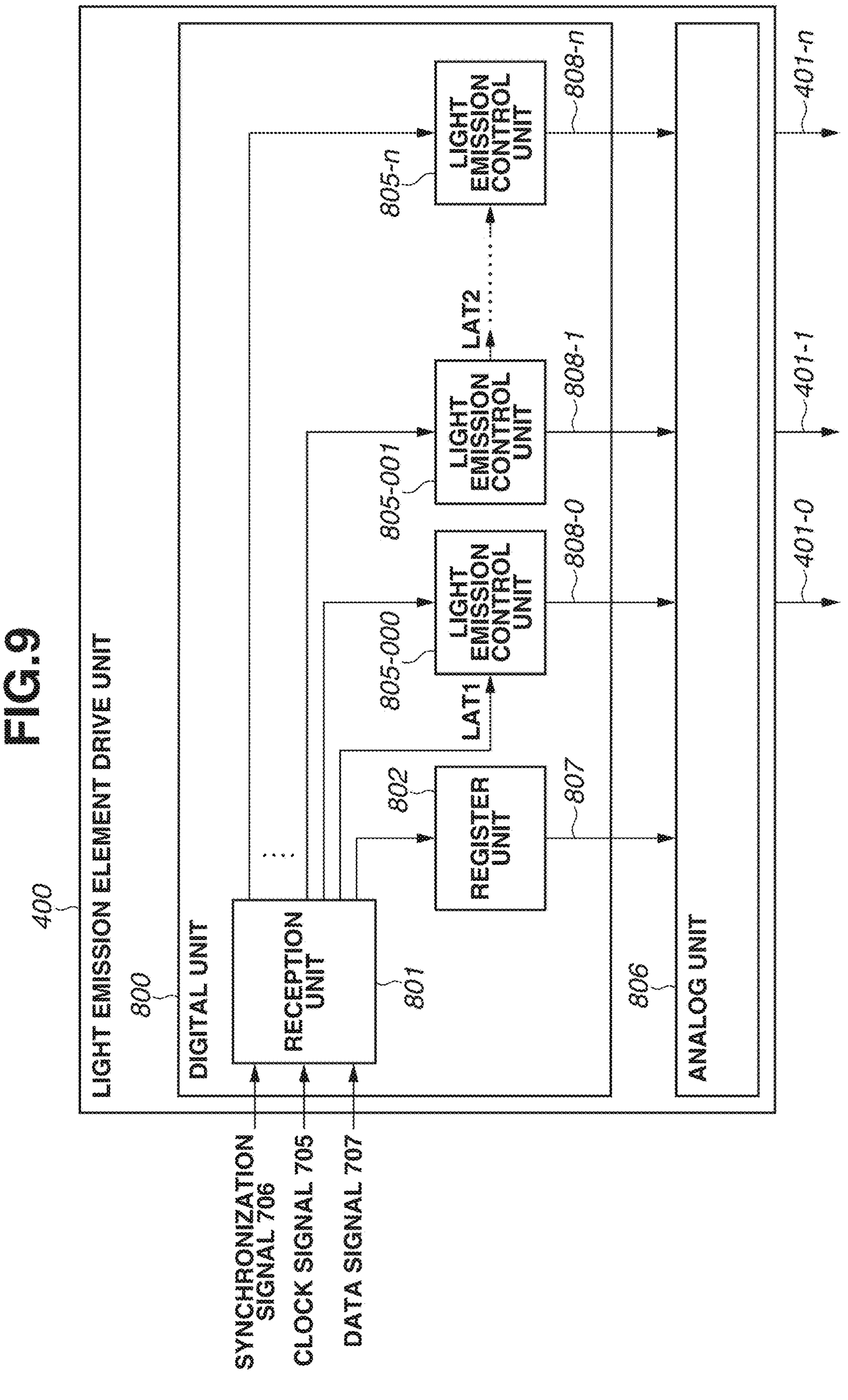
FIG. 9 is a block diagram illustrating a light emission element drive unit.

FIG. 9 illustrates a circuit block diagram illustrating blocks in the light emission element drive unit 400. A light emission element drive unit 400 includes a digital unit 800 and an analog unit 806.

The digital unit 800 receives the clock signal 705, the synchronization signal 706, and the data signal 707 output from the image controller unit 700 by a reception unit 801. The digital unit 800 has a function of generating light emission signals 808 (808-1 to **808-*n*) for turning on the light emission elements 602, and of transmitting the generated light emission signals 808 to the analog unit 806**, in a case where the received content is image data.

Further, in a case where the received data signal 707 is a register setting value, the register setting value is stored in a register unit 802 to change the setting for controlling the operation of the analog unit 806. The register unit 802 outputs a register signal 807 to the analog unit 806 to control the operation of the analog unit 806. The operation of the analog unit 806 controlled by the register unit 802 includes, for example, a setting of setting information of the drive current for driving each of the light emission elements 602 by corresponding one of drive units 1601.

The analog unit 806 generates signals required for driving the light emission elements 602, based on the light emission signals 808 generated in the digital unit 800.

Figure 10:
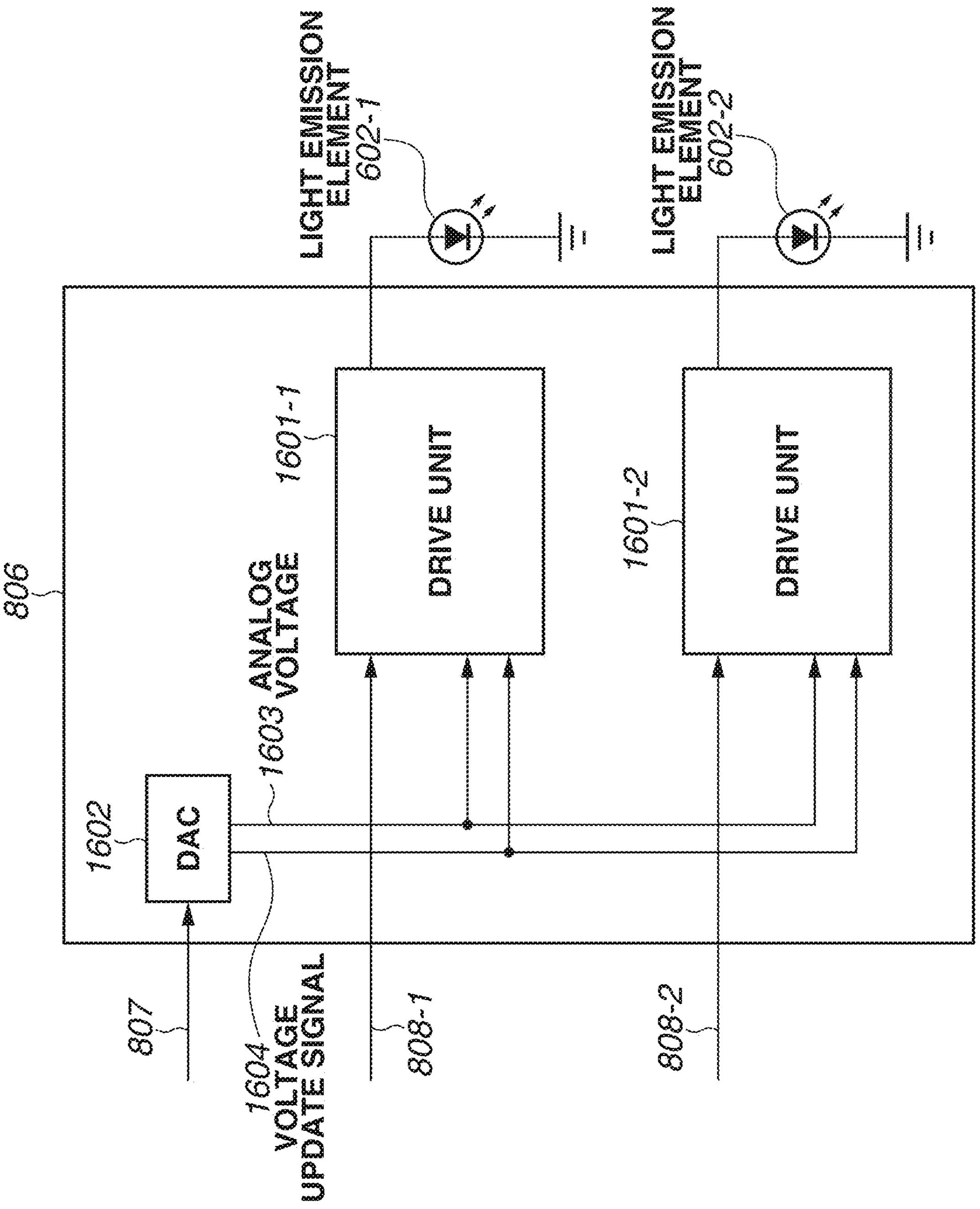
FIG. 10 is a block diagram illustrating an analog unit.

FIG. 10 illustrates blocks in the analog unit 806. In the present embodiment, to simplify descriptions, only the light emission elements 602-1 and 602-2, and the drive units 1601-1 and 1601-2 are illustrated, but the similar drive units are formed respectively corresponding to all the light emission elements 602 in the light emission element group 201.

First, the register signal 807 output based on the data set in the register unit 802 is input to a digital-to-analog converter (DAC) 1602.

Next, an analog voltage 1603 for determining the drive currents of the light emission elements 602-1 and 602-2 is supplied to the drive units 1601-1 and 1601-2. Next, the light emission signal 808-1 is input to the drive unit 1601-1, and the light emission signal 808-2 is input to the drive unit 1601-2. Then, the drive units 1601-1 and 1601-2 cause the light emission elements 602-1 and 602-2 to start emitting light independently by the drive circuit described below, based on the analog voltage 1603 and the light emission signal 808-1, and based on the analog voltage 1603 and the light emission signal 808-2, respectively.

Figure 11:
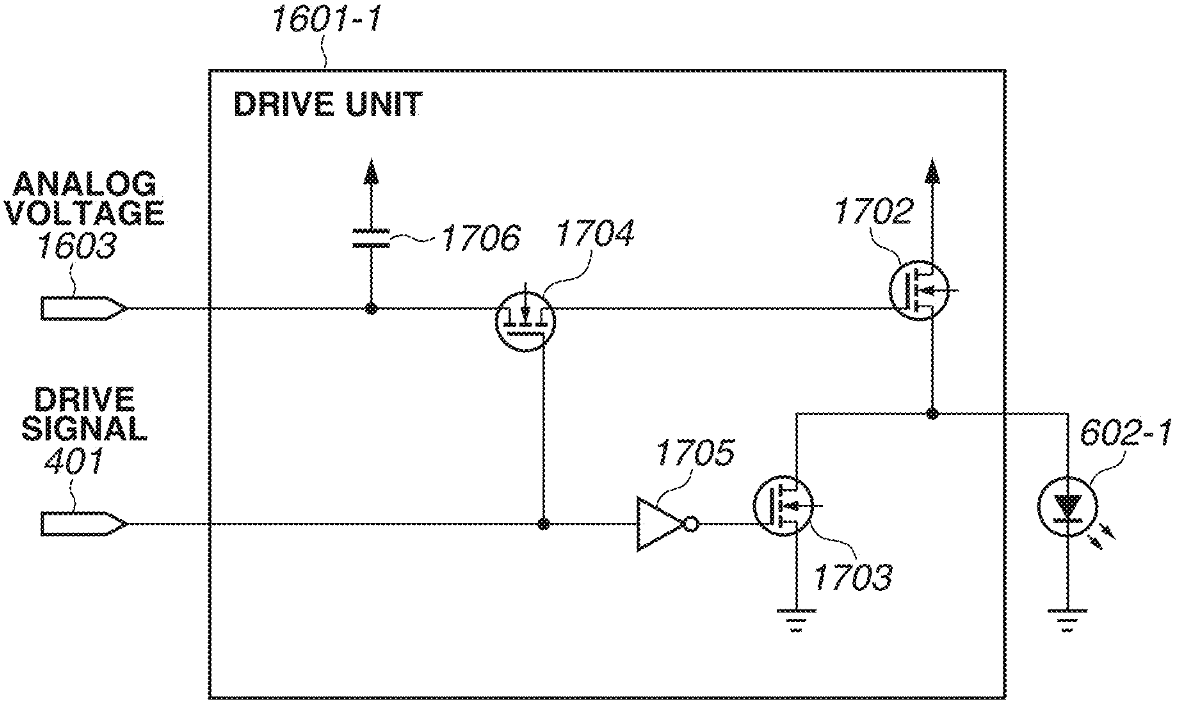
FIG. 11 is a diagram illustrating a drive unit.

FIG. 11 is a diagram illustrating a configuration of the drive unit 1601-1. In addition, the drive unit (e.g., drive unit 1601-2) for each of the light emission elements 602 has a similar configuration. A metal-oxide semiconductor field-effect transistor (MOSFET) 1702 supplies a drive current to the light emission element 602-1 based on a gate voltage value of the MOSFET 1702, and when the gate voltage is at a low level, the MOSFET 1702 controls the drive current to be off (turn off light).

The analog voltage 1603 is connected to a drain of a MOSFET 1704, and when the drive signal 401 is at a high level, the MOSFET 1704 turns on to transfer a voltage held in a capacitor 1706 to the MOSFET 1702. In the present embodiment, the DAC 1602 sets the analog voltage 1603 to the capacitor 1706 at a timing before the image formation, and keeps the set analog voltage level in the capacitor 1706 during the image formation.

Through the above-described operation, the MOSFET 1702 supplies a drive current to the light emission element 602-1 based on the set analog voltage level of the capacitor 1706 and the drive signal 401, to emit light.

A signal obtained by an inverter 1705 logically inverting the light emission signal 808 is input to a gate of a MOSFET 1703. In this way, when the light emission signal is at a low level, the MOSFET 1703 is turned on, to speed up the response time taken up to the emission stop by forcibly discharging the charge stored in an input capacitance of the light emission element 602-1.

Further, each of the light emission control units 805 may include a latch function of latching the drive signal 401 based on the image data received from the reception unit 801 to output the drive signal 401 based on the latched image data to the analog unit 806. Each of the light emission control units 805 latches the image data based on the received latch signal, and outputs the drive signal based on the latched image data to the analog unit 806, during the period of successive two line synchronization signals. Further, the light emission control unit **805-*m* generates the (m+1)th latch signal based on the (m)th latch signal and outputs the (m+1)th latch signal to the light emission control unit 805-(*m*+1). In this way, each of the light emission control units 805 outputs, to the analog unit 806, the drive signal for controlling the light emission/non-emission of corresponding one of the light emission elements 602**.

In the case where each of the light emission control units 805 has such a latch function, since flip-flop circuits do not need to be provided as many as the number of light emission elements 602 for transferring the inputs to the flip-flop circuits in the main scanning direction, it is possible to reduce the increase of size of the light emission chip or the cost, caused by the flip-flop circuits being provided.

Further, the light emission control units 805 each have the above-described latch function, the light emission control units 805 can maintain the light emission off state of the light emission elements 602 by continuing to latch the once received white image data. Since the image controller unit 700 does not need to continue to transmit the white image data to keep the light emission off state of the light emission elements 602, the power consumption of the image controller unit 700 can be reduced compared with a case of continuing to transmit the white image data to keep the light emission off state.

Further, each of the light emission control units 805 may not have such a latch function, and the image controller unit 700 may be configured to continue transmitting the white image data to maintain the light emission off state of the light emission elements 602.

As described above, in the configuration including the detection unit (sensor 115) and the image data generation unit 701 as in the present embodiment, even when the maintenance door 114 is in an open state, power is kept being supplied from the power source 300 to the light emission element drive unit 400. Further, when the maintenance door 114 is opened during the image formation job, the image controller unit 700 outputs the image data indicating the light emission off of the light emission elements 602 to the light emission element drive unit 400. The light emission element drive unit 400 controls the light emission of each of the light emission elements 602 based on the image data. As a result, the light emission elements 602 stop emitting light, and it is possible to suppress unintended formation of the latent image on the surface of the photosensitive drum 102.

Further, as another method of stopping the light emission of each of the light emission elements 602 when the photosensitive drum 102 is stopped, it is conceivable that power supplied to the light emission element drive unit 400 is shut off. However, in such a configuration, there is a possibility that an unintended voltage may be applied from the image controller unit 700 to the light emission element drive unit 400 due to a voltage difference between the image controller unit 700 and the light emission element drive unit 400. As a result, the light emission element drive unit 400 may be broken. To prevent the light emission element drive unit 400 from being broken due to the above-described voltage difference, it is conceivable to provide a protection circuit between the light emission element drive unit 400 and the image controller unit 700. However, the cost increases by providing the protection circuit. On the other hand, according to the present embodiment, even in the state where the maintenance door 114 is in the open state, power is supplied to the light emission element drive unit 400, and further the image data indicating the light emission off of each of the light emission elements 602 is output to the light emission element drive unit 400. As a result, with the configuration according to the present embodiment, it is possible to suppress the unintended formation of the latent image on the surface of the photosensitive drum 102 while suppressing the breakdown of the light emission element drive unit 400 and the increase of the cost.

According to the present disclosure, in an image forming apparatus configured to form an image on a recording medium, it is possible to suppress an unintended formation of a latent image on a photosensitive drum.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

What is claimed is:

1. An image forming apparatus for forming an image on a recording medium, comprising:

a photosensitive drum configured to rotate;

an exposure head comprising a light emitting chip including a plurality of light emitting portions arranged along a direction of an axis of rotation of the photosensitive drum, a drive unit configured to control turning on and off of the plurality of light emitting portions based on image data, and a memory in which control data for controlling an amount of light of the plurality of light emitting portions is stored, and a substrate having mounted thereon a plurality of the light emitting chips;

a maintenance door configured to expose an internal portion of the image forming apparatus by being opened;

a detection unit configured to detect an opening of the maintenance door;

a generation unit configured to generate the image data; and a power source configured to supply power to the light emitting chip, wherein, in a case where the detection unit detects the opening of the maintenance door, the photosensitive drum stops rotating and the generation unit generates and outputs image data indicating turning off of the plurality of light emitting portions, and wherein the power supplied to the light emitting chip is not interrupted in a case where the maintenance door is opened.

2. The image forming apparatus according to claim 1, wherein the light emitting chip further comprises a digital-to-analog converter (DAC) configured to convert digital data into analog data and determine power to be supplied to the plurality of light emitting portions, and wherein the DAC determines an amount of power to be supplied to the plurality of light emitting portions based on the control data.

3. The image forming apparatus according to claim 1, wherein, in a case where the detection unit detects the opening of the maintenance door, the generation unit generates and outputs the image data indicating turning off of the plurality of light emitting portions.

4. The image forming apparatus according to claim 1, wherein the detection unit is a first detection unit, wherein the image forming apparatus further comprises a second detection unit that detects a recording medium conveyed in a conveyance path for conveying the recording medium, and wherein, in a case where the second detection unit detects a jam of the recording medium in the conveyance path, the generation unit generates and outputs the image data indicating turning off of the plurality of light emitting portions.

5. The image forming apparatus according to claim 1, wherein the power supplied to the drive unit is interrupted in a case where a predetermined time has elapsed since the maintenance door was opened.

6. The image forming apparatus according to claim 1, wherein the generation unit generates and outputs the control data.

7. The image forming apparatus according to claim 1, wherein the generation unit and the light emitting chip are connected via a data signal line, and wherein the image data and the control data are communicated via the data signal line.

8. The image forming apparatus according to claim 1, wherein the image data is represented in binary of light on and light off of the light emitting portion.

9. The image forming apparatus according to claim 1, wherein, in a case where the detection unit does not detect the opening of the maintenance door during an image forming operation of forming an image, on the recording medium, corresponding to image data for one page, the generation unit outputs the image data indicating turning off of the plurality of light emitting portions at an end of the image data for one page.

10. The image forming apparatus according to claim 1, wherein, in a case where the detection unit detects the opening of the maintenance door when all of the plurality of light emitting portions is turned off, the generation unit does not output the image data indicating turning off of the plurality of light emitting portions.

11. The image forming apparatus according to claim 1, wherein the plurality of light emitting portions is organic electroluminescence (EL).

12. The image forming apparatus according to claim 1, wherein the light emitting chip is connected to the power source via an electric power line.

13. The image forming apparatus according to claim 12, wherein the light emitting chip further comprises a pad to which the electric power line is connected, and the light emitting chip is supplied with the power via the pad.

* * * * *